(12) United States Patent
Kukreja et al.

(10) Patent No.: US 11,134,078 B2
(45) Date of Patent: Sep. 28, 2021

(54) USER-SPECIFIC SESSION TIMEOUTS

(71) Applicant: Oracle International Corporation, Redwood Shores, CA (US)

(72) Inventors: Chuni Lal Kukreja, Delhi (IN); Ranjan Khanna, Edina, MN (US)

(73) Assignee: Oracle International Corporation, Redwood Shores, CA (US)

( * ) Notice: Subject to any disclaimer, the term of this patent is extended or adjusted under 35 U.S.C. 154(b) by 266 days.

(21) Appl. No.: 16/507,641

(22) Filed: Jul. 10, 2019

(65) Prior Publication Data
US 2021/0014221 A1 Jan. 14, 2021

(51) Int. Cl.
*H04L 29/06* (2006.01)
*G06N 20/00* (2019.01)

(52) U.S. Cl.
CPC ......... *H04L 63/0853* (2013.01); *G06N 20/00* (2019.01); *H04L 63/104* (2013.01); *H04L 63/20* (2013.01)

(58) Field of Classification Search
None
See application file for complete search history.

(56) References Cited

U.S. PATENT DOCUMENTS

| 6,041,357 A | 3/2000 | Kunzelman et al. |
| 6,055,637 A | 4/2000 | Hudson et al. |
| 6,076,108 A | 6/2000 | Courts et al. |
| 6,178,511 B1 | 1/2001 | Cohen et al. |
| 6,338,064 B1 | 1/2002 | Ault et al. |

(Continued)

FOREIGN PATENT DOCUMENTS

| EP | 1864240 | 12/2007 |
| WO | 2013049461 | 4/2013 |

(Continued)

OTHER PUBLICATIONS

U.S. Appl. No. 15/987,631, "Notice of Allowance", dated Apr. 30, 2021, 11 pages.

(Continued)

*Primary Examiner* — Cai Y Chen
(74) *Attorney, Agent, or Firm* — Kilpatrick Townsend & Stockton LLP

(57) ABSTRACT

Techniques for described for generating session-related timeout parameters that are user-specific in value. A user-specific timeout parameter offers several advantages over a static timeout parameter, including minimized the risk of session hijacking, fewer stale sessions to manage, and timeout parameters that more closely match the user's actual behavior. A value for a timeout parameter can therefore depend on information stored for a specific user. The stored information can indicate user behavior observed over a period of time encompassing multiple sessions and/or multiple accesses to the same or different resources. In certain embodiments, a value for a timeout parameter is determined by a prediction engine implemented using a machine learning (ML) model. The ML model may determine the timeout parameter based on information obtained records associated with the user for whom the timeout parameter value is being determined, as well as information from records associated with other users.

20 Claims, 9 Drawing Sheets

(56) References Cited

U.S. PATENT DOCUMENTS

| | | |
|---|---|---|
| 6,385,724 B1 | 5/2002 | Beckman et al. |
| 6,430,619 B1 | 8/2002 | Sitaraman et al. |
| 6,609,198 B1 | 8/2003 | Wood et al. |
| 6,811,873 B2 | 11/2004 | Nadkarni |
| 7,100,195 B1 | 8/2006 | Underwood |
| 7,137,006 B1 | 11/2006 | Grandcolas et al. |
| 7,225,256 B2 | 5/2007 | Villavicencio |
| 7,296,290 B2 | 11/2007 | Barriga et al. |
| 7,426,642 B2 | 9/2008 | Aupperle et al. |
| 7,437,594 B1 | 10/2008 | Mount et al. |
| 7,496,953 B2 | 2/2009 | Andreev et al. |
| 7,525,938 B2 | 4/2009 | Hurtta |
| 7,747,746 B2 | 6/2010 | Thayer et al. |
| 7,761,911 B2 | 7/2010 | Song |
| 7,805,529 B2 | 9/2010 | Galluzzo et al. |
| 7,805,757 B2 | 9/2010 | Menten |
| 7,818,582 B2 | 10/2010 | Marion et al. |
| 7,886,000 B1 | 2/2011 | Polis et al. |
| 7,908,380 B1 | 3/2011 | Chu et al. |
| 7,996,376 B2 | 8/2011 | Singh et al. |
| 8,001,232 B1 | 8/2011 | Saulpaugh et al. |
| 8,073,954 B1 | 12/2011 | Tu et al. |
| 8,117,649 B2 | 2/2012 | Hardt |
| 8,244,907 B2 | 8/2012 | Hinton et al. |
| 8,365,266 B2 | 1/2013 | Bogner |
| 8,438,635 B2 | 5/2013 | Das et al. |
| 8,442,943 B2 | 5/2013 | Multer et al. |
| 8,468,586 B2 | 6/2013 | Koottayi et al. |
| 8,495,195 B1 | 7/2013 | Abidogun et al. |
| 8,544,069 B1 | 9/2013 | Subbiah et al. |
| 8,611,873 B2 | 12/2013 | Onyon et al. |
| 8,627,435 B2 | 1/2014 | Sirota |
| 8,627,479 B2 | 1/2014 | Wittenstein et al. |
| 8,650,305 B2 | 2/2014 | Booth et al. |
| 8,719,342 B2 | 5/2014 | Mutikainen et al. |
| 8,738,774 B2 | 5/2014 | Sheng et al. |
| 8,756,704 B2 | 6/2014 | Castellucci et al. |
| 8,819,444 B2 | 8/2014 | Shahbazi et al. |
| 8,843,997 B1 | 9/2014 | Hare |
| 8,898,765 B2 | 11/2014 | Goyal et al. |
| 8,955,037 B2 | 2/2015 | Srinivasan et al. |
| 8,990,909 B2 | 3/2015 | Kelley |
| 9,083,690 B2 | 7/2015 | Subramanya et al. |
| 9,104,451 B2 | 8/2015 | Subramanya et al. |
| 9,124,582 B2 | 9/2015 | Kalinichenko et al. |
| 9,225,744 B1 | 12/2015 | Behm et al. |
| 9,230,003 B2 | 1/2016 | Goetsch |
| 9,240,886 B1 | 1/2016 | Allen et al. |
| 9,247,006 B2 | 1/2016 | Mathew et al. |
| 9,405,887 B2 | 8/2016 | Yin et al. |
| 9,509,684 B1 | 11/2016 | Dixson-Boles et al. |
| 9,544,293 B2 | 1/2017 | Mathew et al. |
| 9,769,147 B2 | 9/2017 | Mathew et al. |
| 9,866,640 B2 | 1/2018 | Motukuru et al. |
| 9,887,978 B2 | 2/2018 | Goel |
| 9,887,981 B2 | 2/2018 | Mathew et al. |
| 9,900,224 B2 | 2/2018 | Dumitriu et al. |
| 10,009,335 B2 | 6/2018 | Mathew et al. |
| 10,084,769 B2 | 9/2018 | Mathew et al. |
| 10,157,275 B1 | 12/2018 | Venkatasamy et al. |
| 10,454,936 B2 | 10/2019 | Koottayi et al. |
| 10,505,982 B2 | 12/2019 | Motukuru et al. |
| 10,572,649 B2 | 2/2020 | Mathew et al. |
| 10,581,826 B2 | 3/2020 | Kukehalli Subramanya et al. |
| 10,623,501 B2 | 4/2020 | Mathew et al. |
| 10,693,859 B2 | 6/2020 | Kukehalli Subramanya et al. |
| 10,693,864 B2 | 6/2020 | Mathew et al. |
| 2002/0029269 A1 | 3/2002 | McCarty et al. |
| 2002/0078365 A1 | 6/2002 | Burnett et al. |
| 2003/0105862 A1 | 6/2003 | Villavicencio |
| 2003/0212887 A1 | 11/2003 | Walther et al. |
| 2004/0003259 A1 | 1/2004 | Chang |
| 2004/0073666 A1 | 4/2004 | Foster et al. |
| 2004/0260810 A1 | 12/2004 | Bernoth |
| 2005/0091655 A1 | 4/2005 | Probert et al. |
| 2005/0108570 A1 | 5/2005 | Gopalraj |
| 2005/0120091 A1 | 6/2005 | Casais et al. |
| 2005/0144482 A1 | 6/2005 | Anuszewski |
| 2006/0059546 A1 | 3/2006 | Nester et al. |
| 2006/0218630 A1 | 9/2006 | Pearson et al. |
| 2006/0236382 A1 | 10/2006 | Hinton et al. |
| 2006/0277596 A1 | 12/2006 | Calvert et al. |
| 2007/0089167 A1 | 4/2007 | Villavicencio |
| 2007/0147247 A1 | 6/2007 | Kalonji et al. |
| 2007/0192326 A1 | 8/2007 | Angal et al. |
| 2007/0220154 A1 | 9/2007 | El Husseini et al. |
| 2008/0066159 A1 | 3/2008 | Dillaway et al. |
| 2008/0113791 A1 | 5/2008 | Williams et al. |
| 2008/0114883 A1 | 5/2008 | Singh et al. |
| 2008/0294781 A1 | 11/2008 | Hinton et al. |
| 2009/0037581 A1 | 2/2009 | Richardson et al. |
| 2009/0037763 A1 | 2/2009 | Adhya et al. |
| 2009/0047928 A1 | 2/2009 | Utsch et al. |
| 2009/0089437 A1 | 4/2009 | Polozoff |
| 2009/0132639 A1 | 5/2009 | Yan |
| 2009/0216587 A1 | 8/2009 | Dwivedi et al. |
| 2009/0292927 A1 | 11/2009 | Wenzel et al. |
| 2010/0043062 A1 | 2/2010 | Alexander et al. |
| 2010/0082989 A1 | 4/2010 | Bussard et al. |
| 2010/0131755 A1 | 5/2010 | Zhu et al. |
| 2010/0146611 A1 | 6/2010 | Kuzin et al. |
| 2010/0154043 A1 | 6/2010 | Castellucci et al. |
| 2010/0217837 A1 | 8/2010 | Ansari et al. |
| 2010/0290392 A1 | 11/2010 | Rasanen et al. |
| 2011/0010542 A1 | 1/2011 | Choi et al. |
| 2011/0154443 A1 | 6/2011 | Thakur et al. |
| 2011/0173643 A1 | 7/2011 | Nicolson et al. |
| 2011/0185421 A1 | 7/2011 | Wittenstein et al. |
| 2011/0277019 A1 | 11/2011 | Pritchard, Jr. |
| 2011/0307615 A1 | 12/2011 | Krishnaswamy et al. |
| 2012/0078708 A1 | 3/2012 | Taylor et al. |
| 2012/0106333 A1 | 5/2012 | Lee et al. |
| 2012/0191842 A1 | 7/2012 | Hu et al. |
| 2012/0254949 A1 | 10/2012 | Mikkonen et al. |
| 2012/0254957 A1 | 10/2012 | Fork et al. |
| 2012/0266229 A1 | 10/2012 | Simone et al. |
| 2012/0291090 A1 | 11/2012 | Srinivasan et al. |
| 2013/0036454 A1 | 2/2013 | Purvis et al. |
| 2013/0073670 A1 | 3/2013 | Das et al. |
| 2013/0081130 A1 | 3/2013 | Huba et al. |
| 2013/0086651 A1 | 4/2013 | Kavantzas et al. |
| 2013/0086652 A1 | 4/2013 | Kavantzas et al. |
| 2013/0185449 A1 | 7/2013 | Brzozowski |
| 2013/0198818 A1 | 8/2013 | Hitchcock et al. |
| 2014/0025939 A1 | 1/2014 | Smith et al. |
| 2014/0068702 A1 | 3/2014 | Hyndman et al. |
| 2014/0149280 A1 | 5/2014 | Karkhanis et al. |
| 2014/0259109 A1 | 9/2014 | Houston et al. |
| 2014/0282961 A1 | 9/2014 | Dorfman et al. |
| 2014/0304773 A1 | 10/2014 | Woods et al. |
| 2014/0344326 A1 | 11/2014 | Kamath et al. |
| 2015/0059003 A1 | 2/2015 | Bouse |
| 2015/0074407 A1 | 3/2015 | Palmeri et al. |
| 2015/0082029 A1 | 3/2015 | Volchok |
| 2015/0089569 A1 | 3/2015 | Sondhi et al. |
| 2015/0089570 A1 | 3/2015 | Sondhi et al. |
| 2015/0089571 A1 | 3/2015 | Srinivasan et al. |
| 2015/0089579 A1 | 3/2015 | Manza et al. |
| 2015/0089580 A1 | 3/2015 | Manza et al. |
| 2015/0089596 A1 | 3/2015 | Sondhi et al. |
| 2015/0089597 A1 | 3/2015 | Srinivasan et al. |
| 2015/0089617 A1 | 3/2015 | Sondhi et al. |
| 2015/0089619 A1 | 3/2015 | Manza et al. |
| 2015/0089620 A1 | 3/2015 | Manza et al. |
| 2015/0089622 A1 | 3/2015 | Sondhi et al. |
| 2015/0089623 A1 | 3/2015 | Sondhi et al. |
| 2015/0150099 A1 | 5/2015 | Eguchi |
| 2015/0220713 A1 | 8/2015 | Beenau et al. |
| 2015/0220926 A1 | 8/2015 | Mclachlan et al. |
| 2016/0004870 A1 | 1/2016 | Forte et al. |
| 2016/0028737 A1 | 1/2016 | Srinivasan et al. |
| 2016/0065570 A1 | 3/2016 | Spencer, III et al. |
| 2016/0232516 A1 | 8/2016 | Dayan et al. |
| 2016/0285822 A1 | 9/2016 | Adams |

(56) References Cited

U.S. PATENT DOCUMENTS

| | | | |
|---|---|---|---|
| 2016/0294607 A1 | 10/2016 | Davis | |
| 2016/0380941 A1 | 12/2016 | Tanurdjaja et al. | |
| 2016/0380984 A1* | 12/2016 | Johnson | H04L 63/0272 713/153 |
| 2017/0041296 A1 | 2/2017 | Ford et al. | |
| 2017/0118218 A1 | 4/2017 | Koottayi et al. | |
| 2017/0118222 A1 | 4/2017 | Subramanya et al. | |
| 2017/0118249 A1 | 4/2017 | Motukuru et al. | |
| 2017/0126689 A1 | 5/2017 | Lloyd et al. | |
| 2017/0201524 A1 | 7/2017 | Dureau | |
| 2017/0372055 A1* | 12/2017 | Robinson | G06F 21/35 |
| 2018/0157825 A1 | 6/2018 | Eksten et al. | |
| 2018/0191701 A1 | 7/2018 | Kong et al. | |
| 2019/0014102 A1* | 1/2019 | Mathew | G06F 21/41 |

FOREIGN PATENT DOCUMENTS

| | | |
|---|---|---|
| WO | 2015042546 | 3/2015 |
| WO | 2015042547 | 3/2015 |
| WO | 2016051240 | 4/2016 |

OTHER PUBLICATIONS

U.S. Appl. No. 14/754,222, Session Activity Tracking for Session Adoption Across Multiple Data Centers, filed Jun. 29, 2015, 69 pages.

U.S. Appl. No. 15/987,631, Final Office Action, dated Sep. 16, 2020, 14 pages.

BIG-IP Access Policy Manager, Available Online at: http://www.f5.com/pdf/products/big-ip-access-policy-manager-ds.pdf, 2013, 13 pages.

Configuring VMware Identity Manager for Multiple Data Centers, Technical White Paper: VMware Identity Manager 2.8, Available Online at: https://www.vmware.com/content/dam/digitalmarketing/vmware/en/pdf/techpaper/vmware-identity-manager-multiple-data-center-configuration.pdf, Dec. 2016, 16 pages.

Developing an Application to Manage Impersonation, Fusion Middleware, Developer's Guide for Oracle Access Management, Nov. 2012, 10 pages.

Dual Factor Authentication, Reliance, Oct. 24, 2016, 8 pages.

IBM Security Access Manager for Enterprise Single Sign-On, Available online at: http://www-03.ibm.com/software/products/en/access-mgr-esso, Nov. 10, 2016, 2 pages.

IBM Security Access Manager for Enterprise Single Sign-On, Available Online at: http://onwireco.com/wpcontent/uploads/2013/12/IBM_Security_Access_Manager_For_Enterprise_Single_Sign-On.pdf, 2013, 8 pages.

Impersonate Another User: Dynamics CRM 2015, Available Online at: https://msdn.microsoft.com/en-us/library/gg334744(v=crm.7).aspx, 2015, 1 page.

Implementing Single Sign-On Across Multiple Organizations, Developer.force.com, Available Online at: https://developersalesforce.com/page/Lmplementing_Single_Sign-On_Across_Multiple_Organizations, Dec. 19, 2013, 8 pages.

Installing vCenter Single Sign-On in a Multisite Deployment (2034074), Available Online at: http://kb.vmware.com/selfservice/microsites/search.dolanguage=en_US&cmd=displayKC&externalId=2034074, 2014, 2 pages.

Multi-Data Center with Session Sharing, IBM Security Access Manager for Web, Version 7.0, Available Online at: https://www.ibm.com/support/knowledgecenter/SSPREK_7.0.0/com.ibmisam.doc_70/ameb_smsdeploy_guide/concept/c_multi_data_center_with_session.html, 2017, 3 pages.

Multiple Data Centers, Available Online at: https://support.ca.com/cadocs/0/CA%20SiteMinder%2012%2052%20SP1-ENU/Bookshelf_Files/HTML/idocs/index.htm?toc.htm?706393.html?intcmp=searchresultclick&resultnum=452, 2014, 8 pages.

Oracle Enterprise Single Sign-On Suite Plus 11gR2 PS2, Available Online at: http://www.oracle.com/technetwork/middleware/id-mgmt/esso-suite-technical-whitepaper-1519077.pdf, Jan. 2014, 25 pages.

Oracle Fusion Middleware Developer's Guide for Oracle Access Management, Developing an Application to Manage Impersonation, Available Online at: https://docs.oracle.com/cd/E52734_01/oam/AIDEV/impersonation.htm#AIDEV422, 2015, 11 pages.

Oracle Fusion Middleware Developing Web Applications, Using Sessions and Session Persistence, Available Online at: http://docs.oracle.com/cd/E12839_01/web.1111/e13712/sessions.htm#WBAPP301, May 2009, 6 pages.

Oracle Fusion Middleware Performance and Tuning for Oracle WebLogic Server, Available Online at: http://docs.oracle.com/cd/E12839_01/web.1111/e13814/webapptune.htm#PERFM368, 2015, 3 pages.

RSA Adaptive Authentication, RSA Security Product Literature, Available Online at: https://www.rsa.com/en-us/products/fraud-prevention/3d-secure-authentication, 2016, 4 pages.

Symantec Identity: Access Manager, Available Online at: http://www.symantec.com/content/en/us/enterprise/fact_sheets/bsymantec_identity_access_manager_DS_21227840, 2014, 2 pages.

The ABCs of ADCs, White Paper: ABCs of Application Delivery, Available Online at: https://www.fortinet.com/content/dam/fortinet/assets/white-papers/FortiADC-ABCs.pdf, 2014, 8 pages.

The Art of Logging Out, Available online at: https://www.kth.se/social/group/cas/page/the-art-of-logging-out, Apr. 26, 2013, 2 pages.

Understanding Jive Mobile's SSO Compliance, Jive Software, Available online at: https://community.jivesoftware.com/docs/DOC-61829, Jun. 25, 2012, 11 pages.

User Session Monitoring for CA Single Sign-On, Available online at: https://www.ca.com/content/dam/ca/us/files/service-offering/user-session-monitor-for-ca-single-sign-on.pdf, 2015, 1 page.

U.S. Appl. No. 14/135,053, Final Office Action dated Jul. 6, 2015, 17 pages.

U.S. Appl. No. 14/135,053, Non-Final Office Action dated Jan. 29, 2015, 16 pages.

U.S. Appl. No. 14/135,053, Non-Final Office Action dated Nov. 25, 2015, 18 pages.

U.S. Appl. No. 14/135,053, Notice of Allowance dated May 20, 2016, 10 pages.

U.S. Appl. No. 14/135,053, Notice of Allowance dated Aug. 31, 2016, 9 pages.

U.S. Appl. No. 14/137,775, Non-Final Office Action dated May 22, 2015, 10 pages.

U.S. Appl. No. 14/137,775, Notice of Allowance dated Sep. 16, 2015, 9 pages.

U.S. Appl. No. 14/491,076, Final Office Action dated Oct. 25, 2016, 19 pages.

U.S. Appl. No. 14/491,076, Final Office Action dated Oct. 6, 2016, 19 pages.

U.S. Appl. No. 14/491,076, Non-Final Office Action dated Mar. 11, 2016, 13 pages.

U.S. Appl. No. 14/491,076, Notice of Allowance dated Nov. 2, 2017, 11 pages.

U.S. Appl. No. 14/754,222, Non-Final Office Action dated Dec. 1, 2016, 10 pages.

U.S. Appl. No. 14/754,222, Notice of Allowance dated May 17, 2017, 5 pages.

U.S. Appl. No. 14/814,209, Final Office Action dated Jul. 31, 2017, 19 pages.

U.S. Appl. No. 14/814,209, Final Office Action dated Jan. 4, 2019, 21 pages.

U.S. Appl. No. 14/814,209, Non-Final Office Action dated Jan. 11, 2017, 13 pages.

U.S. Appl. No. 14/814,209, Non-Final Office Action dated Aug. 19, 2019, 20 pages.

U.S. Appl. No. 14/814,209, Non-Final Office Action dated May 14, 2018, 20 pages.

U.S. Appl. No. 14/814,209, Notice of Allowance dated Feb. 25, 2020, 9 pages.

U.S. Appl. No. 15/005,365, Final Office Action dated Mar. 10, 2017, 12 pages.

U.S. Appl. No. 15/005,365, Non-Final Office Action dated Aug. 24, 2016, 11 pages.

U.S. Appl. No. 15/005,365, Notice of Allowance dated Sep. 27, 2017, 16 pages.

(56) References Cited

OTHER PUBLICATIONS

U.S. Appl. No. 15/143,240, Final Office Action dated Dec. 15, 2017, 14 pages.
U.S. Appl. No. 15/143,240, Non-Final Office Action dated Jun. 5, 2017, 11 pages.
U.S. Appl. No. 15/143,240, Notice of Allowance dated May 24, 2018, 15 pages.
U.S. Appl. No. 15/291,804, First Action Interview Office Action Summary dated Jun. 17, 2019, 5 pages.
U.S. Appl. No. 15/291,804, First Action Interview Pilot Program Pre-Interview Communication dated Jan. 11, 2019, 4 pages.
U.S. Appl. No. 15/291,804, Notice of Allowance dated Oct. 22, 2019, 12 pages.
U.S. Appl. No. 15/331,211, Advisory Action dated Feb. 4, 2019, 5 pages.
U.S. Appl. No. 15/331,211, Final Office Action dated Oct. 16, 2018, 34 pages.
U.S. Appl. No. 15/331,211, Non-Final Office Action dated Jun. 6, 2018, 26 pages.
U.S. Appl. No. 15/331,211, Notice of Allowance dated Aug. 15, 2019, 22 pages.
U.S. Appl. No. 15/331,613, First Action Interview Office Action Summary dated May 29, 2019, 7 pages.
U.S. Appl. No. 15/331,613, First Action Interview Pilot Program Pre-Interview Communication dated Jan. 4, 2019, 5 pages.
U.S. Appl. No. 15/331,613, Notice of Allowance dated Aug. 21, 2019, 12 pages.
U.S. Appl. No. 15/331,613, Notice of Allowance dated Jul. 9, 2019, 19 pages.
U.S. Appl. No. 15/356,384, First Action Interview Pilot Program Pre-Interview Communication dated Feb. 8, 2019, 5 pages.
U.S. Appl. No. 15/356,384, Notice of Allowance dated Oct. 30, 2019, 8 pages.
U.S. Appl. No. 15/356,384, Notice of Allowance dated Jun. 12, 2019, 9 pages.
U.S. Appl. No. 15/372,342, Non-Final Office Action dated Oct. 20, 2017, 14 pages.
U.S. Appl. No. 15/372,342, Notice of Allowance dated Mar. 13, 2018, 12 pages.
U.S. Appl. No. 15/707,261, Final Office Action dated Mar. 8, 2019, 6 pages.
U.S. Appl. No. 15/707,261, Non-Final Office Action dated Sep. 13, 2018, 10 pages.
U.S. Appl. No. 15/707,261, Notice of Allowance dated Jun. 27, 2019, 5 pages.
U.S. Appl. No. 15/707,261, Notice of Allowance dated Oct. 11, 2019, 5 pages.
U.S. Appl. No. 15/782,700, Non-Final Office Action dated Jan. 26, 2018, 7 pages.
U.S. Appl. No. 15/782,700, Notice of Allowance dated Aug. 8, 2018, 13 pages.
U.S. Appl. No. 15/784,029, Final Office Action dated Mar. 5, 2020, 26 pages.
U.S. Appl. No. 15/784,029, Non-Final Office Action dated Aug. 22, 2019, 14 pages.
U.S. Appl. No. 15/987,631, Non-Final Office Action dated Mar. 3, 2020, 12 pages.
U.S. Appl. No. 16/140,343, Non-Final Office Action dated Aug. 7, 2019, 11 pages.
U.S. Appl. No. 16/140,343, Notice of Allowance dated Feb. 7, 2020, 8 pages.
U.S. Appl. No. 61/880,335, Multiple Resource Servers With Single, Flexible, Pluggable Oauth Server and Oauth-Protected Restful Oauth Consent Management Service, and Mobile Application Single Sign on Oauth Service, filed Sep. 20, 2013, 154 pages.
U.S. Appl. No. 61/880,400, Single Sign-On Between Multiple Data Centers, filed Sep. 20, 2013, 50 pages.
U.S. Appl. No. 61/880,569, Adaptive Authentication for Enterprise Software Environments, filed Sep. 20, 2013.
U.S. Appl. No. 61/880,598, Cookie Based Session Management, filed Sep. 20, 2013, 34 pages.
Dacosta et al., One-Time Cookies: Preventing Session Hijacking Attacks with Stateless Authentication Tokens, ACM Transactions on Internet Technology, vol. 12, No. 1, Jun. 2012, 31 pages.
Ferguson et al., Session Management Server: Session Transitions and State, Available Online at: http://www.ibm.com/developerworks/tivoli/library/t-sms-states/, Jun. 25, 2007, 7 pages.
Gaur, IBM Extreme Transaction Processing (XTP) Patterns: Scalable and Robust HTTP Session Management with WebSphere eXtreme Scale, Available Online at: http://www.ibm.com/developerworks/websphere/library/techarticles/0905_gaur/0905_gaur.html, May 27, 2009, 8 pages.
Haire, A Solution to SSO Authentication and Identity Management: Lessons Learned, Atlassian Blog, May 16, 2013, 5 pages.
Heo et al., Statistical SIP Traffic Modeling and Analysis System, IEEE, Oct. 2010, pp. 1223-1228.
Izumi et al., Toward Practical Use of Virtual Smartphone, IEEE 9th Asia-Pacific Symposium on Information and Telecommunication Technologies (APSITT), Dec. 12, 2012, 5 pages.
Maruyama et al., Dynamic Route Selection Algorithms for Session Based Communication Networks, ACM, vol. 13, No. 2, Apr. 1983, pp. 162-169.
Menasce et al., Resource Management Policies for E-Commerce Servers, ACM Sigmetrics Performance Evaluation Review, vol. 27, No. 4, Mar. 2000, pp. 27-35.
Mortimore et al., Implementing Single Sign-On Across Multiple Organizations, Available Online at: https://developersalesforce.com/page!Implementing_Single_Sign-On_Across_Multiple_Organizations, Oct. 2014, 15 pages.
Murdoch, Hardened Stateless Session Cookies, In International Workshop on Security Protocols, Apr. 2008, 9 pages.
Nagalakshmi et al., Confident Multi-Factor Authentication on Web Application via Captcha Technologies, International Journal of Computer Engineering in Research Trends, vol. 2, No. 8, Aug. 2015, pp. 516-522.
Pujolle et al., Secure Session Management with Cookies, 7th International Conference on Information, Communications and Signal Processing (ICICS), 2009, 6 pages.
Rivard, Clearing Novell Access Manager Application Sessions, Available Online at: https://www.netiq.com/communities/cool-solutions/clearing-novell-access-manager-application-sessions/, Jan. 26, 2009, 4 pages.
Samar, Single Sign-On Using Cookies for Web Applications, Enabling Technologies: Infrastructure for Collaborative Enterprises, (WET ICE '99) Proceedings. IEEE 8th International Workshops on, Stanford, CA, 1999, pp. 158-163.
Stirpe et al., Time-Out Management in Multi-Domain Single Sign-On, Available Online at: http://www.strattagroup.com/tsg/pubs/ssotime-out.pdf, 2005, 13 pages.
Volodarsky et al., Fast, Scalable, and Secure Session State Management for Your Web Applications, Available Online at: https://msdn.microsoft.com/enus/magazine/cc163730.aspx, 2015, 9 pages.
Ye, A Complete Impersonation Demo, Available Online at: http://www.codeproject.com/Articles/125810/A-complete-Impersonation-Demo-in-Csharp-NET, Jun. 20, 2013, 12 pages.
U.S. Appl. No. 15/784,029, Final Office Action dated Jul. 8, 2021, 26 pages.

* cited by examiner

USER-SPECIFIC SESSION TIMEOUTS

BACKGROUND

Access to protected resources (e.g., software applications) is often provided through an access management (AM) system comprising one or more servers that, upon successful authentication based on validating user credentials, creates a session for the user along with generating an access token and/or a session token. For example, the access token could be an Open Authorization (OAuth) token, and the session token can be a browser cookie. The session/access token contains information about the user and the session. For example, the token can include timeout information for the session. The timeout information can be specified in various ways, including as an idle timeout or an expiration timeout. Idle timeout is a parameter that specifies a time period (e.g., ten minutes) for which the user can be idle before the AM system automatically logs the user out, thus terminating the current session and rendering all tokens issued in connection with the session invalid. After being logged out, the user will need to re-authenticate in order to access the resource again. Expiration timeout, also referred to as session timeout, is a parameter that specifies a duration for which the session is valid. Similar to the idle timeout parameter, after this duration expires, the session is automatically terminated, thus requiring the user to re-authenticate.

In conventional AM systems, the timeout information is not user-specific. Typically, idle timeout and expiration timeout are parameters that have been configured (e.g., by a system administrator) for a specific resource. These parameters are generic parameters which are fixed (static) in value once configured. Thus, the same idle timeout and expiration timeout are applied for all users who log in through the AM system. In addition to expiration timeout and idle timeout, the AM system may employ other timeout parameters that are also not user-specific, for example, a global timeout that applies to any sessions created for administrative users.

Static timeout parameters pose a security risk because using a timeout parameter that is much longer than necessary in view of a user's actual usage behavior creates an opportunity for session hijacking and other malicious behavior from third parties. For example, if a user is active for ten minutes, but the session timeout is thirty minutes, then during the twenty minute window between the user becoming inactive and the session timing out, a third party could take advantage of the user's continuing session in order to improperly gain access to the protected resource. Conversely, if a timeout parameter is too short, then the user would be logged out more frequently than is warranted given the user's behavior, resulting an experience that is not user-friendly. Another disadvantage of static timeout parameters is the administrative burden on the AM system in connection with storing information for stale sessions.

BRIEF SUMMARY

The present disclosure relates generally to techniques for determining a value for a session-related timeout parameter, where the value is specific to a particular user. Providing a user-specific timeout parameter avoids the above-mentioned problems with a conventional static timeout parameter. For instance, the timeout parameter can be set to a value that minimizes the risk of session hijacking. There are many ways in which a session created for a user can be hijacked, for example, through prediction of the session token, session sniffing, client-side attacks (cross-site scripting, malicious JavaScript Codes, Trojans, etc.), man-in-the-middle attacks, and man-in-the-browser attacks. The risk is exaggerated by the fact that most sessions are relatively long lived. Reducing the duration of the timeout parameter can offset these risks, but the duration should not be too short since, as explained above, this may result in a poor user experience. Setting a timeout parameter to a value appropriate for a specific user minimizes security risk while being user-friendly. The number of stale user sessions maintained at any given time is also reduced.

Embodiments are described herein for determining a timeout parameter value in an intelligent manner, for example, based on user behavior observed over a period of time encompassing multiple sessions and/or multiple accesses to the same or different resources. In certain embodiments, the timeout parameter value is determined by a prediction engine implemented using a machine learning (ML) model. The ML model can be constructed as a neural network, a Bayesian network, or some other type of ML model. The ML model may determine the timeout parameter based on information obtained from user records, including records associated with the user for whom the timeout parameter value is being determined, as well as records associated with other users of an access management (AM) system.

In certain embodiments, an AM system may employ multiple ML models for determining timeout parameter values. For example, a session timeout value can be determined using a first ML model, and an idle timeout value can be determined using a second ML model. Some ML models may be configured to determine timeout values based on information about multiple users, while other ML models may determine timeout values based on information about the individual user for whom the timeout parameter value is being determined, without using information about other users. The choice of which ML model to use may be determined based on policy information. For example, the AM system can be configured with a role-based access control (RBAC) policy and an attribute-based access control (ABAC) policy, where the RBAC policy indicates that the session timeout value should be determined using an ML model that employs information for various user groups, and where the ABAC policy indicates that the idle timeout value should be determined using an ML model that employs user-specific information without using group information.

Another aspect of the present disclosure relates to training of an ML model to enable the ML model to accurately predict the appropriate timeout parameter value for any given user. In certain embodiments, the ML model is trained on features that are extracted from user records. These features can represent a history of session-relevant user activity. For example, the ML model can be trained on information indicating what resources a particular user or user group has accessed, durations of resource access, recorded session durations, and the like.

In certain embodiments, an access management system includes one or more processors and a memory coupled to the one or more processors. The memory stores instructions that, when executed by the one or more processors, cause the one or more processors to perform processing including receiving a user credential from a computing device of a first user, and determining, based on a comparison of the user credential to information stored for the first user, that the user credential is valid. The processing further includes, responsive to the determining that the user credential is valid: determining a value for a first timeout parameter, where the value depends on information stored for the first user and indicates a time period that, when elapsed, causes the access management system to terminate a session created by the access management system for the first user; and sending the value to the computing device of the first user in at least one of an access token or a session token. The access token is presentable for accessing a protected resource during the session, and the session token is usable by the assess management system to track activity of the first user during the session.

In certain embodiments, the information stored for the first user comprises a history of one or more previous accesses by the first user to the same protected resource, and the value for the first timeout parameter is determined using a machine learning model that has been trained using the history of one or more previous accesses by the first user.

In certain embodiments, the information stored for the first user indicates that the first user is a member of a user group, and the value for the first timeout parameter is determined using a machine learning model that has been trained using a history of one or more previous accesses by other members of the user group to the protected resource.

In certain embodiments, the information stored for the first user comprises information indicating a duration between previous accesses by the first user to the protected resource.

The first timeout parameter can be a session timeout or an idle timeout. In certain embodiments, the value for the first timeout parameter is determined based on linear regression applied to observations concerning previous accesses by the first user or by multiple users, each previous access being to the same or a different protected resource.

In certain embodiments, a first machine learning model is selected for use in determining the value for the first timeout parameter, and a second machine learning model is selected for use in determining a value for a second timeout parameter. The first machine learning model and the second machine learning model are selected based on respective access policies.

DETAILED DESCRIPTION

Figure 1:
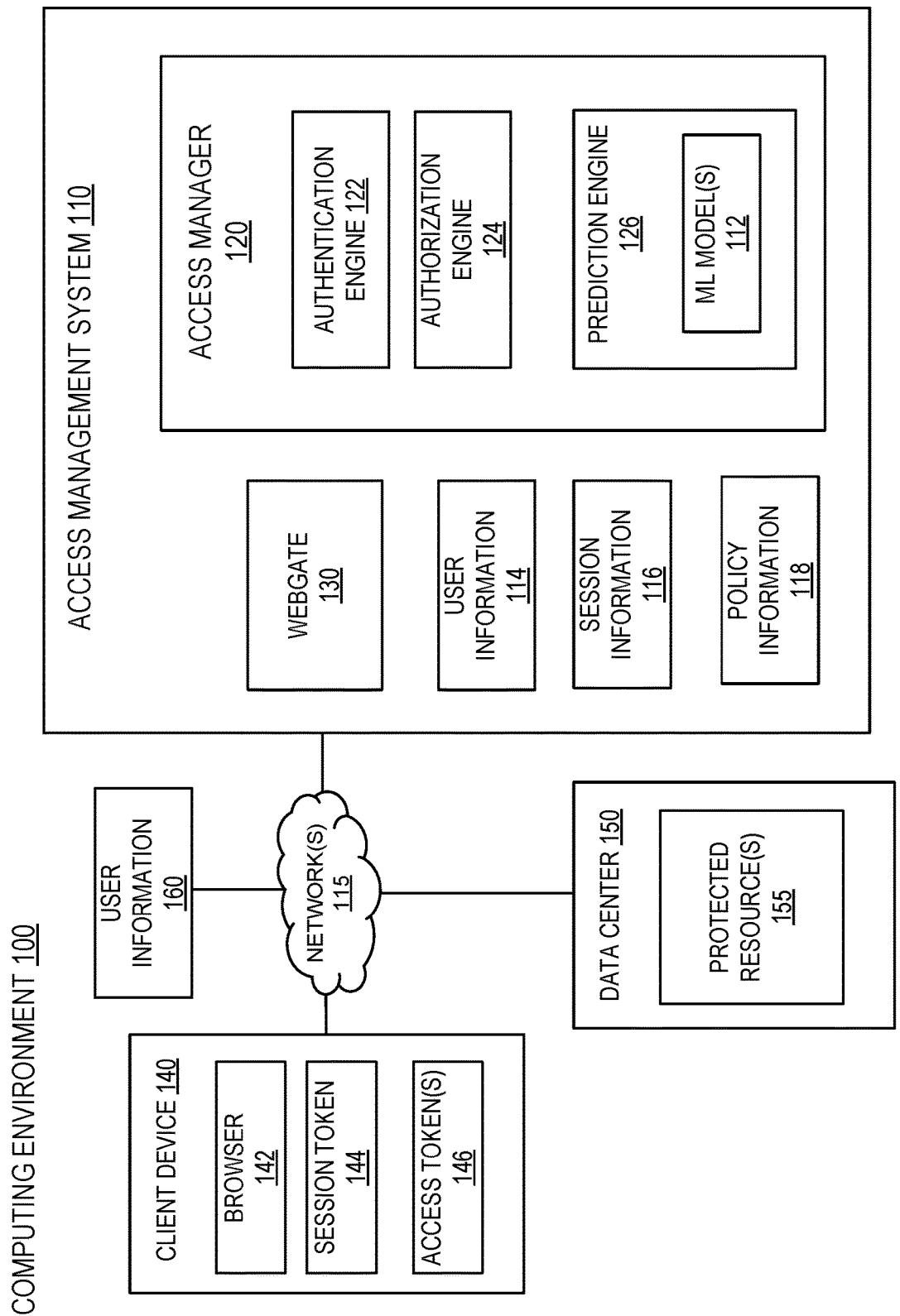
FIG. 1 is a simplified block diagram of a computing environment including an AM system, according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Various inventive embodiments are described herein, including methods, systems, non-transitory computer-readable storage media storing programs, code, or instructions executable by one or more processors, and the like.

The present disclosure relates generally to techniques for determining a value for a session-related timeout parameter, where the value is specific to a particular user. Embodiments are described herein for determining a timeout parameter value in an intelligent manner, for example, based on user behavior observed over a period of time encompassing multiple sessions and/or multiple accesses to the same or different resources. In certain embodiments, the timeout parameter value is determined by a prediction engine implemented using a machine learning (ML) model. The ML model can be constructed as a neural network, a Bayesian network, or some other type of ML model. The ML model may determine the timeout parameter based on information obtained from user records, including records associated with the user for whom the timeout parameter value is being determined, as well as records associated with other users of an access management (AM) system.

In certain embodiments, an AM system may employ multiple ML models for determining timeout parameter values. For example, a session timeout value can be determined using a first ML model, and an idle timeout value can be determined using a second ML model. Some ML models may be configured to determine timeout values based on information about multiple users, while other ML models may determine timeout values based on information about the individual user for whom the timeout parameter value is being determined, without using information about other users. The choice of which ML model to use may be determined based on policy information. For example, the AM system can be configured with a role-based access control (RBAC) policy and an attribute-based access control (ABAC) policy, where the RBAC policy indicates that the session timeout value should be determined using an ML model that employs information for various user groups, and where the ABAC policy indicates that the idle timeout value should be determined using an ML model that employs user-specific information without using group information.

In certain embodiments, timeout parameter values are not only user-specific, but also resource-specific. For example, different session timeout values can be generated by an ML model for the same user, but for different resources. Thus, an access token generated for a first resource can have a different timeout parameter value than an access token generated for a second resource, even though both access tokens are for the same user.

Another aspect of the present disclosure relates to training of an ML model to enable the ML model to accurately predict the appropriate timeout parameter value for any given user. In certain embodiments, the ML model is trained on features that are extracted from user records. These features can represent a history of session-relevant user activity. For example, the ML model can be trained on information indicating what resources a particular user or user group has accessed, durations of resource access, recorded session durations, and the like.

FIG. 1 is a simplified block diagram of a computing environment 100 including an AM system 110, according to certain embodiments. The AM system 110 comprises an access manager 120 and a webgate 130, and is coupled to a client device 140 through one or more communication networks 115. The AM system 110 manages access to protected resources 155 within the computing environment 100. As depicted in FIG. 1, these resources can be hosted in a data center 150 that is also coupled to the communication network 115 so as to be accessible to the client device 140. Access to the protected resources 155 can be conditioned upon the existence of a valid session created for a user of the client device 140. The session can be created by an access manager 120 of the AM system 110 and, in some embodiments, is a single sign-on (SSO) session that permits the user to, without having to re-authenticate each time a different resource is requested, access resources hosted by different providers or in different resource domains.

Resources can include any item managed and/or stored by a computing system (e.g., a data center) and made available for access by one or more users. Examples of such items include files (e.g., documents, spreadsheets, and images), computational resources (e.g., processing power, cloud storage, and network communication bandwidth), software applications, and/or the like. Requests for access to resources can be generated in response to user interaction with an application. For example, FIG. 1 shows a web browser 142 installed on client device 140. The user of client device 140 may request access to a particular resource by, for example, opening a uniform resource locator (URL) associated with the resource.

Webgate 130 operates as a gateway that intercepts an access request from the client device 140 to determine that the request is directed to a resource which is protected. The webgate 130 is an intermediary between the client device 140 and the AM system 110 and may forward the access request to the access manager 120 for further processing. In some embodiments, the webgate 130 is separate from the AM system 110.

Access manager 120 can be implemented using one or more computer servers and, in certain embodiments, includes at least one of a server running Oracle Access Manager or an OpenID Connect (OIDC) server. The access manager 120 is configured to, in response to receiving an access request directed to a protected resource, perform authentication and authorization procedures to determine whether to grant access to the protected resource. Thus, the access manager 120 may include an authentication engine 122 and an authorization engine 124. The authentication engine 122 can issue a challenge that prompts the user to supply one or more user credentials (e.g., a username and password, or some other authentication factor). Upon receiving the requested credentials from the client device 140, the authentication engine 122 may validate the user supplied credentials by comparing the user supplied credentials to information stored for the user (e.g., a stored username and password). The information stored for the user can be user information 114 that is stored locally within the AM system 110 or user information 160 stored remotely, e.g., on a separate computing system that is coupled to the AM system 110 via the communication network 115.

Communication networks 115 facilitate communications between the various systems depicted in FIG. 1. Communication networks 115 can be of various types and can include one or more communication networks. Examples of communication networks 115 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as the Institute of Electrical and Electronics (IEEE) 802.XX suite of protocols, TCP/IP, IPX, SAN, AppleTalk®, Bluetooth®, and other protocols. In general, communication networks 115 may include any infrastructure that facilitates communications between the various systems depicted in FIG. 1.

Upon successful authentication of the user, the access manager 120 may create a session if no session currently exists for the user. As part of creating the session, the access manager 120 can associate the user with the session (e.g., by storing a user identifier (ID) in session information 116) and may determine various session parameters such as an idle timeout parameter and/or a session timeout parameter. As explained below, these timeout parameters can be determined using a prediction engine 126 which, in certain embodiments, is part of the access manager 120. The access manager 120 may also generate a session token 144 containing at least some of the session information 116. For example, the session token 144 can be an encrypted browser cookie comprising the user ID, a session ID, a timestamp of when the session was created, the session timeout parameter, and the idle timeout parameter. The access manager 120 can, via the webgate 130, send the session token 144 to the client device 140 for storage, e.g., in a browser cache.

In addition to generating the session token 144, the access manager 120 can also generate an access token 146 for storage on the client device 140. The access token 146 may be specific to a particular protected resource and can be presented (e.g., to the data center 150) for obtaining access to the protected resource. The access token 146 can be generated in response to successful completion of an authorization procedure executed by the authorization engine 124. The authorization procedure can, for example, be based on an OAuth protocol. Access tokens can be generated in connection with session creation. For example, both a session token and an access token can be generated in response to successful validation of user credentials and as part of creating a session. Access tokens can also be generated after a session has already been created. For example, the session may have been created in connection with a request for a first resource and the user may, after accessing the first resource, request access to a different resource that requires authorization. Thus, over the lifetime of a session, multiple access tokens 146 can be generated. Subsequent authorizations can, like the user authentication that results in session creation, be based on validation of user credentials.

The AM system 110 may be configured with policy information 118 for access policies (e.g., RBAC and/or ABAC policies) that govern access to the protected resources 155. Access policies can be configured at one or more levels, including at the resource level, at the user level, and at the enterprise level (e.g., for a group of users). The access policies represented in the policy information 118 may dictate what authentication and authorization procedures are used by the access manager 120 to service any given access request. Further, as explained below, access policies can also govern which ML model is applied by the prediction engine 126 for determining a timeout parameter value.

Figure 3:
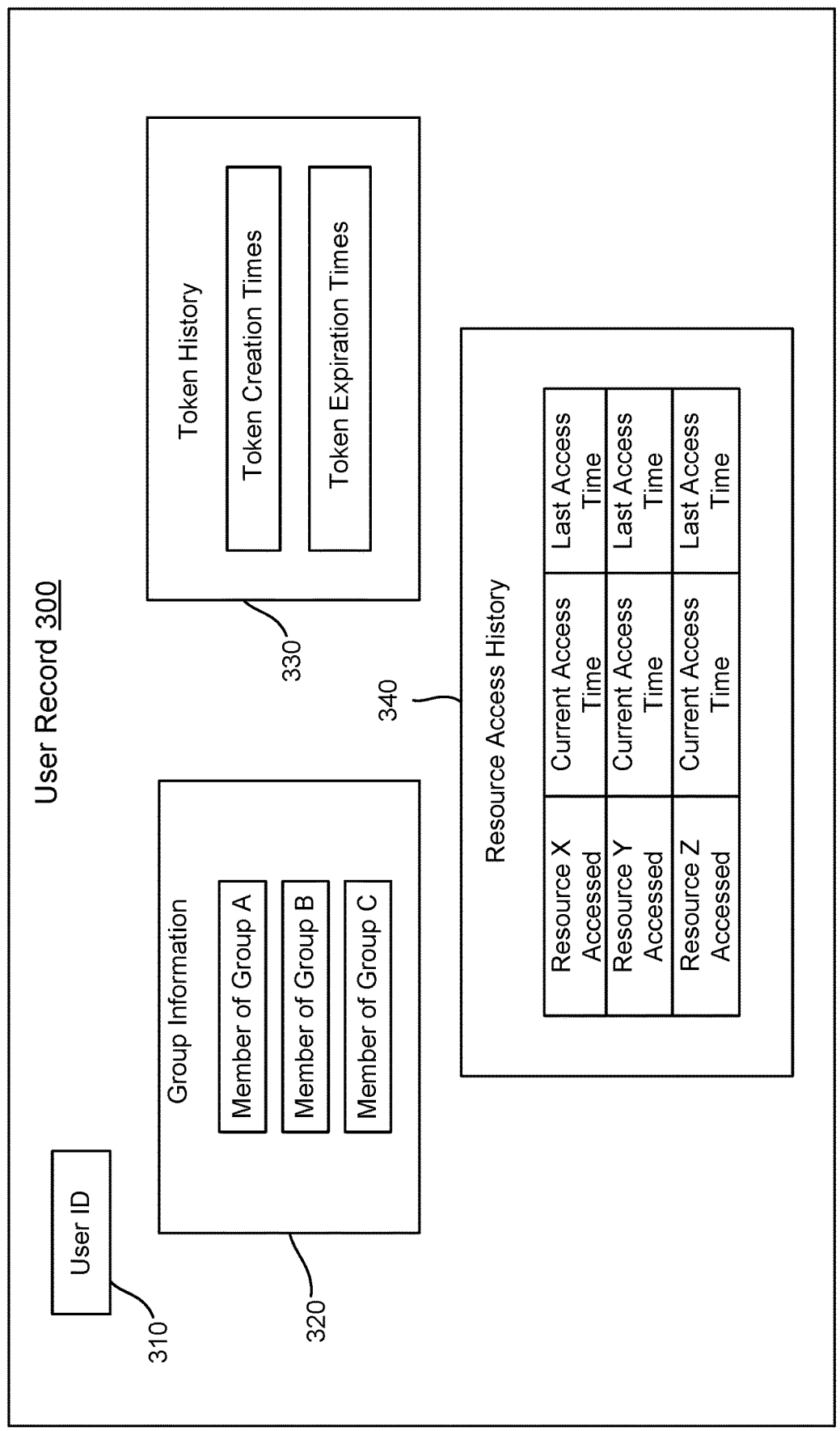
FIG. 3 shows an example user record, according to certain embodiments.

Prediction engine 126 determines a timeout parameter value (e.g., a session timeout value or an idle timeout value)

based on information about the user of client device 140 or information about other users (e.g., users who are members of the same group or groups as the user of client device 140). The information used for determining a timeout parameter value can include user access history, and can be stored in user profiles or records, e.g., as part of the user information 114 or the user information 160. An example of a user record is shown in FIG. 3. Timeout parameter values can be represented in various ways. For example, a session timeout can be specified as a particular time of day and/or a particular date (e.g., a certain day of a month) on which the session will automatically expire. Alternatively, a session timeout could be specified as a time duration that commences from a time that the session was created.

The access manager 120 can include the timeout parameter value determined by the prediction engine 126 in the session token 144 and/or the access token 146, so that when the token is subsequently presented (e.g., to data center 150 or back to the AM system 110), the timeout parameter value can be checked by the token receiver to determine whether the session is still valid. For example, upon receiving an access token with an expired session timeout, the data center 150 may deny access to a requested resource. Similarly, upon receiving an access token with an expired session timeout, the AM system 110 may invalidate the access token and terminate the session associated with the access token. The AM system 110 may also be configured to determine whether an idle timeout period or a session timeout period has elapsed by monitoring user activity and, in response to determining that the idle timeout period or session timeout period has elapsed, terminate the session.

The prediction engine 126 can be implemented using one or more ML models 112. An ML model 112 can determine a timeout parameter value based on information that is specific to the user for whom the token is being generated (e.g., the user of the client device 140). In certain embodiments, one or more ML models 112 can determine a timeout parameter based on information about multiple users including, for example, users who are members of the same group as the user for whom the token is being generated. The ML models 112 can be trained prior to being used to determine a timeout parameter value for inclusion in a token. Training is described in connection with FIG. 2.

Additionally, in certain embodiments, the access manager 120 may determine whether there is sufficient history stored for a particular user, as a condition for applying an ML model 112. For example, as explained in connection with FIG. 2, the prediction engine 126 can be configured to learn the amount of user history that should be collected in order for an ML model to be able to determine an appropriate timeout parameter value (e.g., a session timeout duration that is close to typical session lengths for a particular user or an idle timeout duration that is close to the time length for which the user is usually active before becoming idle).

Figure 2:
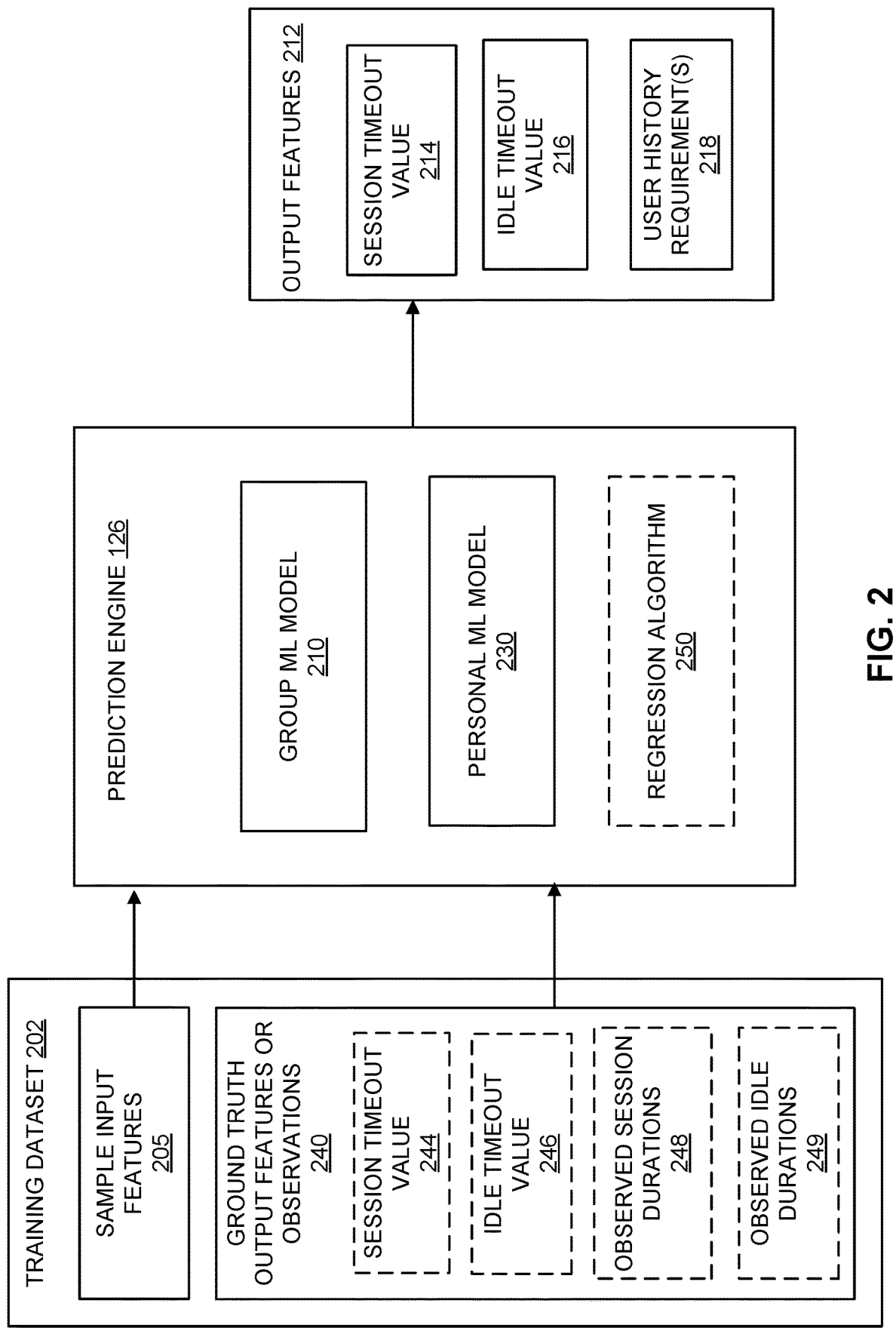
FIG. 2 depicts training of an ML model, according to certain embodiments.

FIG. 2 depicts training of an ML model, according to certain embodiments. FIG. 2 corresponds to an implementation of the prediction engine 126 from FIG. 1. As shown in FIG. 2, the prediction engine 126 may comprise a group ML model 210 and an personal ML model 230, both of which can be trained through supervised learning. In certain embodiments, the prediction engine 126 can construct a separate personal ML model 230 for each user of access management system 110. In the example of FIG. 2, the prediction engine 126 receives sample input features 205 and generates output features 212. The prediction engine 126 can refine the models 210 and 230 based on comparison of the output features 212 to corresponding ground truth output features 240. The sample input features 205 and the ground truth output features 240 form a training dataset 202. In the example of FIG. 2, the sample input features 205 are features derived from a record for a single user, who may be a member of one or more user groups. Thus, the sample input features 205 can be representative of a specific user as well as representative of one or more user groups. The training dataset 202 can be extended to include sample input features and ground truth output features derived from records of multiple users.

The user record used to form the training dataset 202 can be a record of an actual user of the AM system 110 or a record for a hypothetical user of the AM system 110. As explained in connection with FIG. 3, a user record can include information on user attributes (e.g., user ID and group membership status) in addition to user activity information (e.g., dates and/or times associated with accesses to particular resources). The information contained in a user record can be converted into corresponding input features by, for example, reformatting the information as a Boolean variable or some other format understandable by the prediction engine 126.

Prediction engine 126 can apply the group ML model 210 to determine, for a particular user group represented in the sample input features 205, a session timeout value 214, an idle timeout value 216, and one or more user history requirements 218 (e.g., a threshold number of resource accesses, a threshold number of sessions created, and the like). Similarly, the session timeout value 214, the idle timeout value 216, and the one or more user history requirements 218 could also be determined for the specific user represented in the sample input features 205, by applying the personal ML model 230 instead of the group ML model 210.

In certain embodiments, the timeout parameter values determined by the group ML model 210 are user-specific even though information of multiple users (e.g., access histories of users in the same group) is taken into consideration. For instance, the group ML model 210 may, in addition to considering access histories of other users who are in the same group, also consider the access history of the specific user for whom the timeout parameter value is being determined. The group ML model 210 may, in fact, give more weight the specific user's access history in comparison to that of the other users.

Training can involve comparing the session timeout value 214 to a ground truth session timeout value 244 and adjusting the computational processes of the model 210 or 230 based on a result of the comparison. For example, if the models 210 and 230 are implemented as neural networks, the training may involve adjusting weights and/or bias values used in neural network computations, where the adjustment minimizes an error function representing the difference between the session timeout value 214 and the ground truth session timeout value 244. Similarly training can be based on comparison of the idle timeout value 216 to a ground truth idle timeout value 246.

As an alternative to comparing output features to ground truth features, training can be based on regression analysis. Thus, the prediction engine 126 may execute a regression algorithm 250 which, in certain embodiments, is a linear regression algorithm. Linear regression involves computing a mathematical function corresponding to a line that best fits a set of data points, where the data points are observations. In this instance, the observations can correspond to session durations 248 and/or idle durations 249 obtained from user records. Other session-related information can also potentially serve as the observations. The observations can be based on activity of a single user or activity of multiple users. The line is a function of one or more input variables which, in this example, can correspond to the sample input features 205. When there are multiple input variables (e.g., user ID, user group, resource name, etc.), the linear function can be expressed as a weighted sum in which each variable is multiplied by a respective coefficient. The values of the coefficients are determined based on minimizing an error function, also known as a cost function, that represents the difference between the linear function and the observations. Thus, the role of the cost function is similar to that of the error function discussed above in connection with neural networks.

Linear regression can be performed as a single-step operation (using the so-called Normal Equation) or an iterative operation (using gradient descent). Because it is non-iterative, the Normal Equation approach is more computationally efficient compared to gradient descent when the number of input variables is small (e.g., less than ten thousand), but can be slower than gradient descent when a large number of input variables are involved. For purposes of computing timeout parameter values, either approach is suitable. The Normal Equation approach expresses the linear function as a multiplicative product between a transpose matrix of coefficients and a matrix representing the input variables. The solution for the set of coefficients that minimizes the cost function is, likewise, expressed as a matrix multiplication. Gradient descent involves adjusting the coefficient values, computing a derivative of the cost function and, based on the slope of the derivative, determining the adjustment for the next iteration, until the coefficient values which minimize the cost function are located.

In certain embodiments, the prediction engine 126 performs regularization, which is a process that adjusts the coefficients of the linear function in order to avoid overfitting. Regularization can be implemented by adding a term to the cost function. The benefits of regularization are particularly noticeable as the number of input variables increases.

Prediction engine 126 can determine the user history requirements 218 using the same model that generates the session timeout value 214 and the idle timeout value (e.g., the group ML model 210 or the personal ML model 230). That is, the ML model that determines the timeout parameter value can also be configured to learn how much user history should be collected before the same ML model is applied. Alternatively, the user history requirements 218 can be determined using a separate ML model. The user history requirements can differ between the group ML model 210 and the personal ML model 230. In particular, because the personal ML model 230 might take into consideration fewer group-based information (or no group information at all) compared to the group ML model 210, the personal ML model 230 may rely more heavily upon recorded history for the specific user.

Although training can be a one-time process, an ML model can be updated based on subsequent user or user group behavior. Thus, the group ML model 210 or the personal ML model 230 may adapt to changing behavior so that the timeout parameter values generated by the model are appropriate for the user's behavior or the user group's behavior, even when such behavior changes over time.

FIG. 3 shows an example user record 300, according to certain embodiments. The user record 300 can store information used for training an ML model or information that is input to the ML model for determining a timeout parameter value after the ML model has been trained. FIG. 3 shows examples of a few types of information that are relevant to session timeout. Other types of information stored in a user record may also be relevant. As shown in FIG. 3, the user record 300 includes a user ID 310, group information 320, token history 330, and resource access history 340. The user record 300 can be stored as part of the user information 114 and/or the user information 160 in FIG. 1.

The user ID 310 can be a unique identifier assigned by the AM system 110 to the user associated with the user record 300. The user ID 310 can, in certain embodiments, serve as an index to the user record 300. The group information 320 indicates whether the user associated with the user record 300 is a member of one or more predefined user groups. For example, in an enterprise setting where a protected resource is accessed by multiple employees, access policies may be defined that specify different levels of access to the resource depending, for example, on whether the employee is a member of a human resources (HR) group, a finance group, or an administrative (admin) group.

The token history 330 can include information on creation times and expiration times for session tokens and access tokens. Creation and expiration times for session tokens may be indicative of actual session duration, which can be computed based on the difference between the time at which a session token was created and the time at which the same session token expired (e.g., as a result of a session expiration timeout or the user manually logging out). Similarly, creation and expiration times for access tokens may be indicative of how long the user remained active in connection with accessing a particular resource.

The resource access history 340 provides a history of which resources were accessed by the user and corresponding access times. For example, the resource access history 340 may indicate, for any particular resource that the user has previously accessed, the current (most recent) access time and the last (prior to most recent) access time. Thus the user record 300 can include one of more of the following attributes:

group_name: the name of a group to which a user belongs.
userid: a user identifier.
app_accessed_by_user: the name of an application/resource a user has accessed.
current_app_accessed_time: the current timestamp at which the user has accessed an application/resource.
last_app_accessed_time: the last timestamp recorded at which the user has accessed an application/resource.
token_creation_time: a creation time of a token (e.g., an access token or session token).
token_expiry_time: an expiration time of a token (e.g., an access token or session token).
idle_timeout: a global idle timeout with which the access manager is configured.

The information in the user record 300 can be used by the access manager to track user activity over the course of a single session or over multiple sessions. The user record 300 may include information indicative of, for example, login and logout times, how long the user has been active since the most recent login, how many login and logouts the user has performed, and whether the user has been active within a certain period of time (e.g., within the last two days, months, or years). This information is dynamic in nature and changes over time and with user activity.

Attributes stored in the user record 300 can be converted for use as input features to an ML model (e.g., the group ML model 210 or the personal ML model 230). In particular, an attribute whose status can be represented by a yes or no may be converted into a Boolean variable, e.g., a Boolean variable "is_group_hr" with a value of zero or one depending on whether the user is a member of the HR group. Resource access times and token creation/expiration times can be also be converted. For example, the access server may store times in the form of a Unix timestamp, but the group ML model 210 or the personal ML model 230 may be configured to receive time information in day:month:year and hour:minute:second format.

Figure 4:
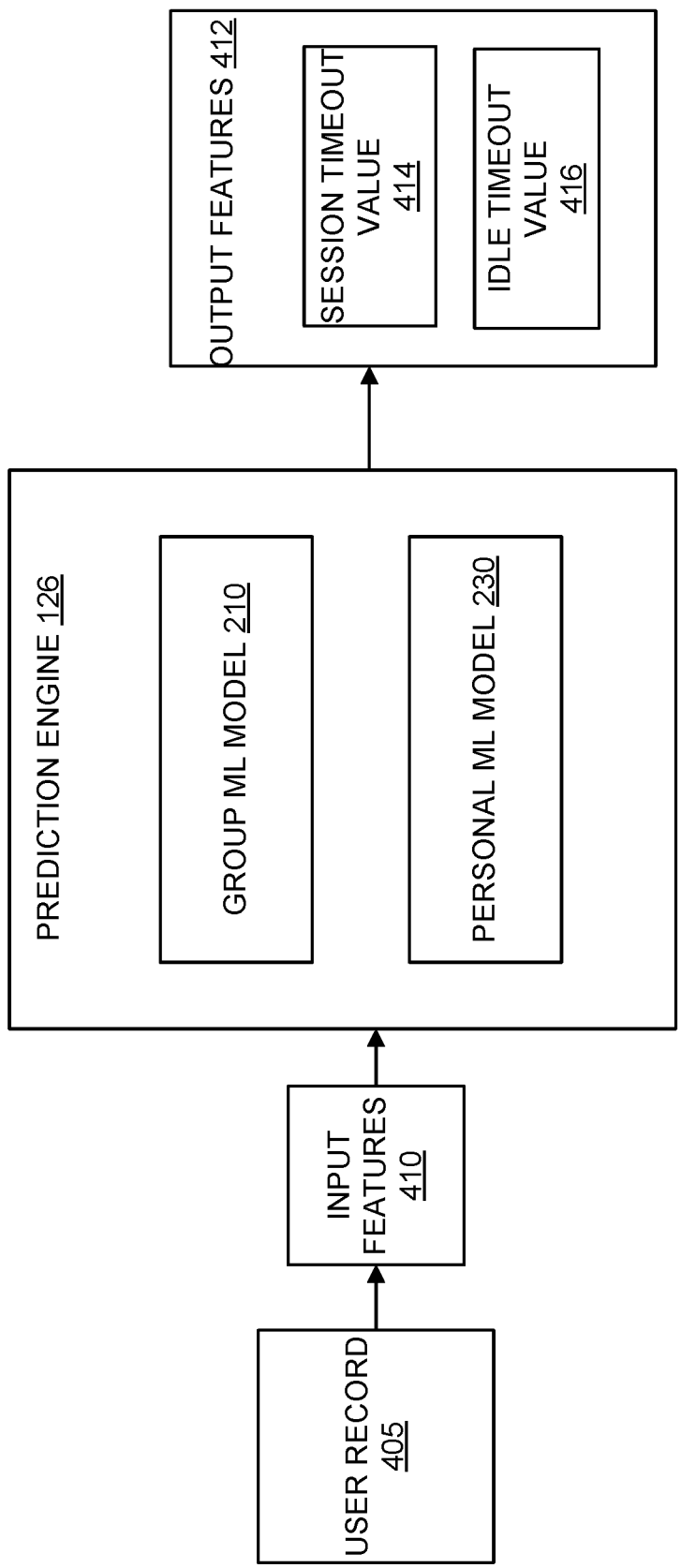
FIG. 4 depicts the generating of timeout parameters using a trained ML model, according to certain embodiments.

FIG. 4 depicts generating timeout parameters using a trained ML model, according to certain embodiments. FIG. 4 may represent the prediction engine 126 after the prediction engine has been trained in accordance with the example of FIG. 2. In FIG. 4, the prediction engine 126 receives input features 410 to generate, based on applying the group ML model 210 and/or the personal ML model 230 to the input features 410, output features 412. The input features 410 may comprise attributes derived from information contained in a user record 405, where the user record 405 represents a history of activity for a specific user. Using the group ML model 210 and/or the personal ML model 230, the prediction engine 126 determines, as the output features 412, a session timeout value 414 and an idle timeout value 416.

With sufficient training of the ML models, the timeout parameter values generated in FIG. 4 can accurately reflect an amount of time that is appropriate for the user. For example, if the user typically remains idle for two minutes, then the idle timeout value 416 may be slightly longer than two minutes (e.g., approximately three minutes). The timeout parameter values can also reflect group behavior. For example, if each user in a set of users belonging to the HR group accesses an application for at least fifteen minutes, while each user in a set of users belonging to the finance group accesses the same application for ten minutes or less, then the session timeout value 414 can be different, e.g., longer for HR group members and shorter for finance group members.

In certain embodiments, at least some of the timeout parameter values depend upon the behavior of individual users in connection with resource accesses. For example, if the user tends to be idle for ten minutes at a time when accessing a first resource (e.g., a travel-related software application), while being idle for fifteen minutes at a time when accessing a second resource (e.g., a finance-related software application), then an idle timeout value 416 of slightly longer than ten minutes can be used when the idle timeout is generated for inclusion in an access token that permits access to the first resource. Session timeout can, likewise, be determined taking into consideration the identity of the resource being accessed.

In some embodiments, the prediction engine 126 may take into consideration patterns in past user behavior. Such patterns can be used to determine timeout parameter values as a function of time. For example, if a user has a habit of accessing the same application for thirty minutes during a time slot between 4:00 PM and 6:00 PM, then the next time the user logs in during this time slot for the purpose of accessing the application, the prediction engine 126 can generate an access token with a session timeout of thirty minutes or longer. Timeout parameter values can be therefore be determined for a specific user and for a specific time slot and/or a specific calendar date. As such, time of day or calendar date may be variables that contribute to a cost function that is minimized during training or subsequent updating of an ML model.

In the example of FIG. 4, the session timeout value 414 and the idle timeout value 416 may be generated in connection with creating a new session for the user associated with the user record 405. In some embodiments, timeout parameter values are periodically updated based on new information about users. The AM system can propagate an update during an existing session for a user by invalidating previously issued tokens, so that the user has to re-authenticate in order to obtain a new session token or access token. Alternatively, an updated timeout parameter value can be provided when an existing token is subsequently refreshed.

If the prediction engine 126 includes multiple ML models, the choice of which model or models to use for determining the session timeout value 414 and the idle timeout value 416 may, in certain embodiments, be dictated by any access policies that are in place. For example, the AM system may be configured with an RBAC policy that requires using group ML model 210 for generating the session timeout value 414. The AM system may further be configured with an ABAC policy that requires using personal ML model 230 for generating the idle timeout value 416. Thus, based on what access policies have been defined, the AM system can pick an ML model to use at runtime for determining one or more timeout parameter values.

Figure 5:
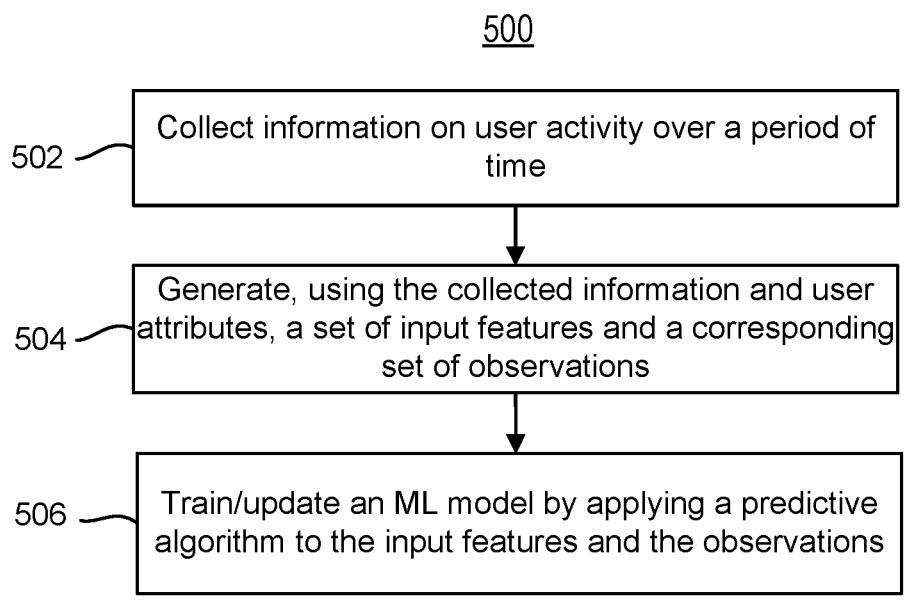
FIG. 5 is a flow diagram of an example process for training or updating an ML model, according to certain embodiments.

FIG. 5 is a flow diagram of an example process 500 for training or updating an ML model, according to certain embodiments. The processing depicted in FIG. 5 can be performed to train an ML model as well as to subsequently update the ML model based on new user information.

In certain embodiments, the processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processes and methods presented in FIG. 5 and described below are intended to be illustrative and non-limiting. Although FIG. 5 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 1, the processing depicted in FIG. 5 may be performed by one or more components of an AM system (e.g., access manager 120).

At 502, information on user activity is collected over a period of time. If the ML model being trained or updated is a personal ML model, the user activity may be activity associated with a single user. Alternatively, if the ML model being trained or updated is a group ML model, the user activity may be associated with multiple users. The user activity for any given user can be stored in one or more user records, e.g., the user record 300 in FIG. 3. The user activity information may indicate what resources were accessed, access timestamps, lengths of time for which a user was idle, session durations, and the like.

At 504 a set of input features and a corresponding set of observations are generated using the information collected at 502, and further using user attributes. The user attributes can, in some embodiments, be obtained from the same user records in which the user activity is stored. For example, the user attributes can include a user ID and information indicating membership in one or more groups. The set of input features may correspond to variables in an error or cost function to be minimized, as described earlier in connection with FIG. 2. The set of observations may comprise observations about the actual values of one or more timeout parameters.

At 506, an ML model is trained or updated by applying a predictive algorithm to the input features and the observations. The predictive algorithm applied at 506 can vary depending on the implementation. In certain embodiments, the predictive algorithm is a regression algorithm (e.g., a linear regression algorithm). The predictive algorithm may compute a mapping (e.g., a linear function) between the input features and the observations. The mapping enables the ML model to predict an output value when given one or more input features that are not represented in the input features used at 506. Thus, once trained or updated, the ML model can be applied to new input features to determine at least one timeout parameter value for a specific user.

Figure 6:
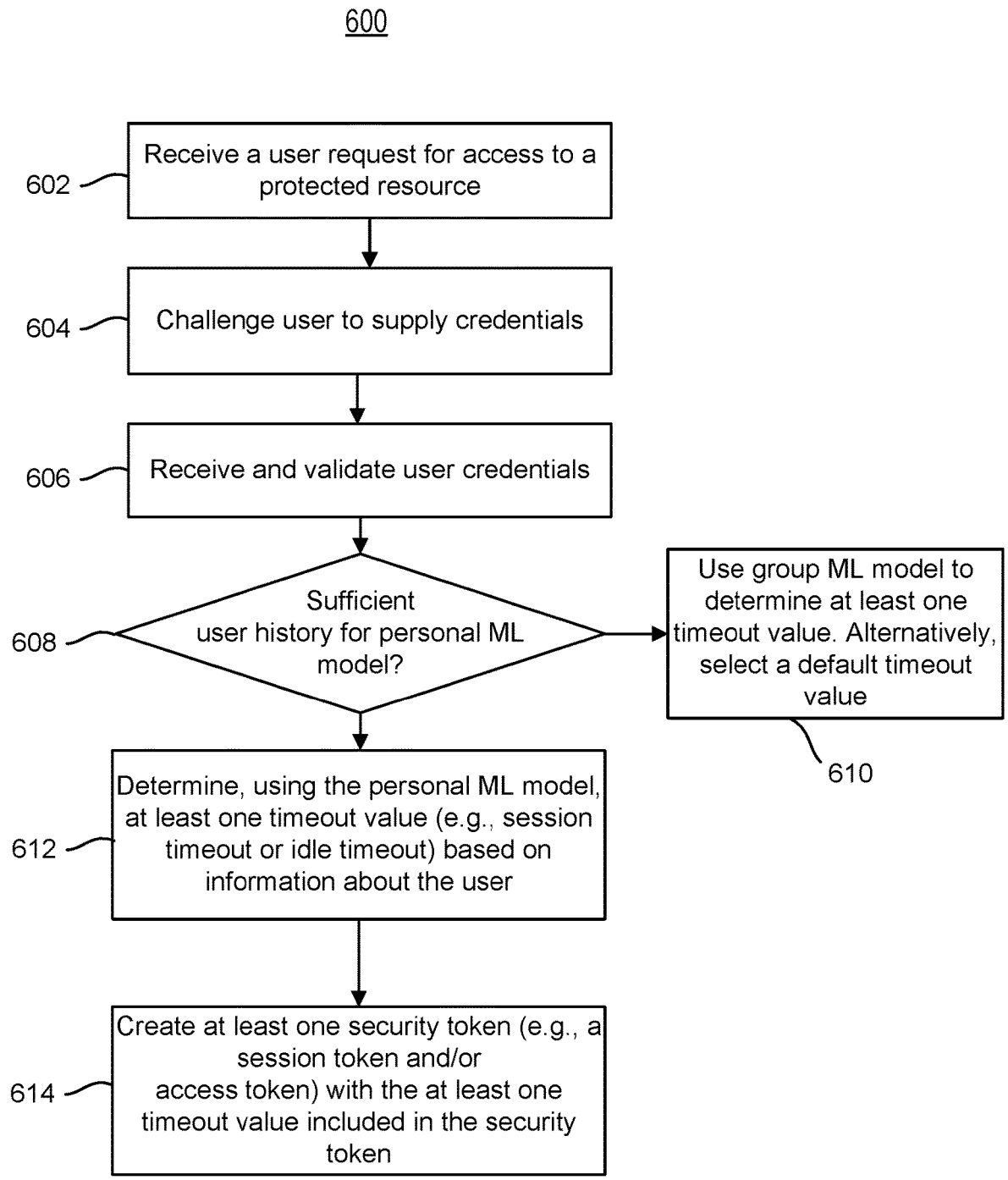
FIG. 6 is a flow diagram of an example process for generating a security token, according to certain embodiments.

FIG. 6 is a flow diagram of an example process 600 for generating a security token, according to certain embodiments. The process 600 can be performed with the aid of a trained ML model, e.g., a model trained in accordance with the examples described in connection with FIG. 2 and/or in accordance with the example process in FIG. 5.

In certain embodiments, the processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processes and methods presented in FIG. 6 and described below are intended to be illustrative and non-limiting. Although FIG. 6 depicts various processing steps occurring in a particular sequence or order, this is not intended to be limiting. In certain alternative embodiments, the steps may be performed in a different order, certain steps omitted, or some steps performed in parallel. In certain embodiments, such as in the embodiment depicted in FIG. 1, the processing depicted in FIG. 6 may be performed by one or more components of an AM system (e.g., access manager 120).

At 602, a user request for access to a protected resource is received. The user request may, for instance, be sent from client device 140, intercepted by webgate 130, and redirected to access manager 120.

At 604, the user is challenged to supply credentials. The challenge may involve displaying a prompt message on a user interface of the client device 140 or redirecting the client device 140 to a login page of a web site.

At 606, the user credentials requested at 604 are received and validated. The validation may involve comparing the received user credentials to stored user credentials to determine that they match. At this point, the user has been successfully authenticated. If the user does not already have an active session, a session may be created. Regardless of whether a session is created in response to the validation of the user credentials at 606, the process 600 proceeds to 608.

At 608, a determination is made as to whether sufficient user history has been collected to warrant use of a personal ML model for determining at least one timeout parameter value. In certain embodiments, the AM system is manually configured with one or more thresholds to indicate how much user history is required. For example, an administrator of the AM system could specify a minimum required number of accesses to the same resource, a minimum required number of session terminations as a result of idle timeout, or a minimum required number of previously created sessions. Alternatively, as explained earlier in connection with FIG. 2, the user history requirements can be determined through machine learning.

Further, in certain embodiments, the user history requirements are implicitly enforced through an error/cost function that is minimized in order to train the personal ML model. If the cost function cannot be sufficiently minimized (e.g., below a certain value), this may indicate that there is not enough user history to, for example, compute the best fit function for a linear regression. Thus, the user history requirements do not necessarily have to be explicitly determined.

If there is sufficient user history, the process proceeds to 610, where the group ML model may be applied to determine at least one timeout parameter value. Otherwise, the process proceeds to 612. If the group ML model is applied, input features corresponding to current information (e.g., the user's current group memberships, the current time or date, the name of the resource currently being accessed, etc.) are input to the group ML model. Alternatively, a default (e.g., static) timeout parameter can be used instead of applying the group ML model. Whether the group ML model is applied at 610 may depend on the existence of any access policies in place. For example, the group ML model could be used to determine a session timeout value so long as there are no access policies that prevent such use of the group ML model. Additionally, the group ML model may, similarly to the personal ML model, also be subject to user history requirements.

At 612 the personal ML model is used to determine at least one timeout parameter value (e.g., a session timeout or an idle timeout) based on current information about the user from whom the request was received at 602. This current information may include information described as input to the group ML model in 610, such as the name of the resource currently being accessed or the current time or date. Which timeout parameter values can be generated using the personal ML model may be governed by access policies. In certain embodiments, the personal ML model is used for determining idle timeout values, while the group ML model is used for determining session timeout values. However, the same model can also be applied for determining both idle timeout and session timeout.

At 614, at least one security token (e.g., a session token and/or an access token) is created with the at least one timeout parameter value included (e.g., in a designated field) within the security token. The security token may be forwarded to the client device of the user for storage. The security token can then subsequently presented for accessing a protected resource or for tracking the user's activity during the session.

Figure 7:
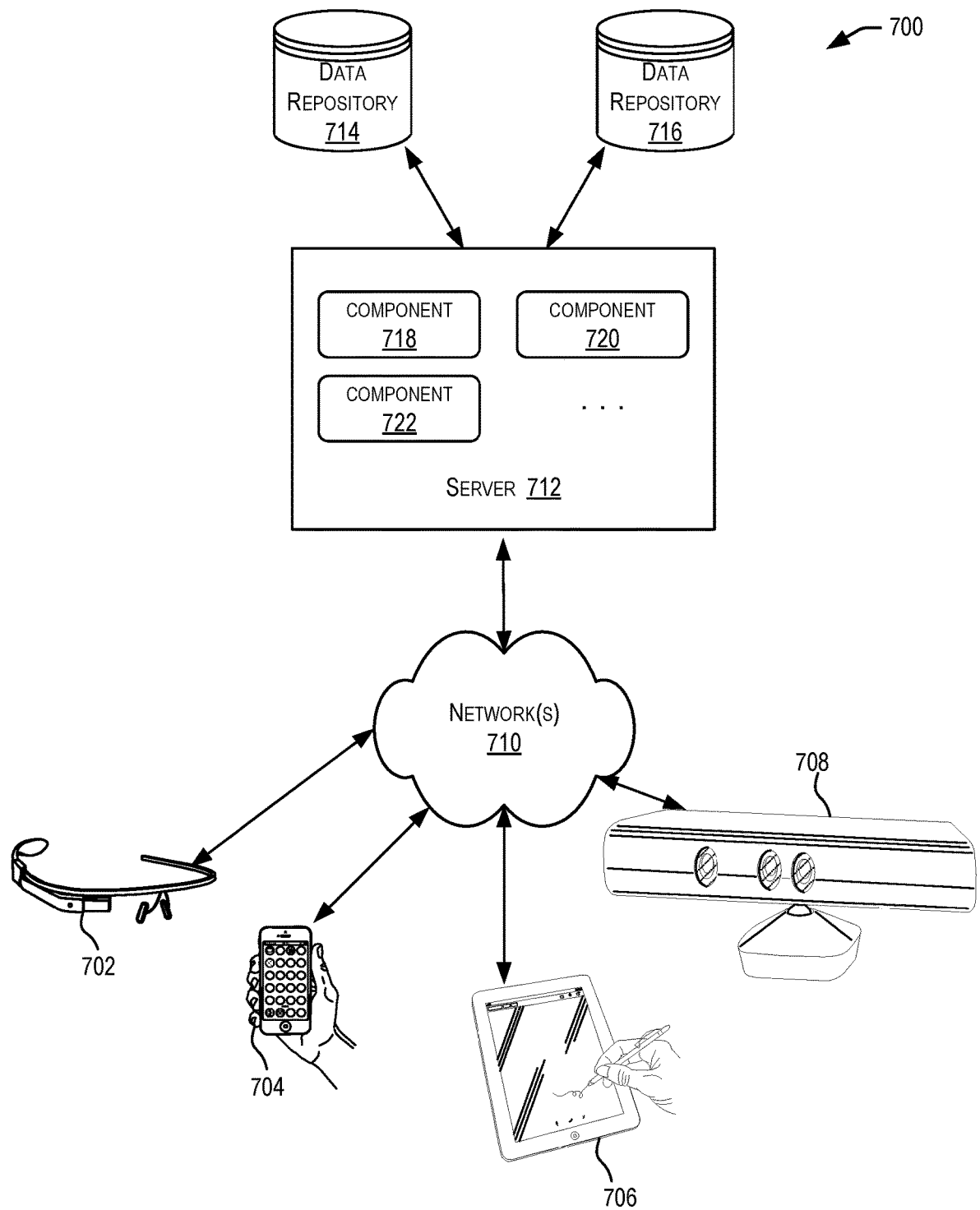
FIG. 7 depicts a simplified diagram of a distributed system for implementing an embodiment.

FIG. 7 depicts a simplified diagram of a distributed system 700 for implementing an embodiment. In the illustrated embodiment, distributed system 700 includes one or more client computing devices 702, 704, 706, and 708, coupled to a server 712 via one or more communication networks 710. Clients computing devices 702, 704, 706, and 708 may be configured to execute one or more applications.

In various embodiments, server 712 may be adapted to run one or more services or software applications that enable a user-specific timeout parameter value to be generated for inclusion in a security token.

In certain embodiments, server 712 may also provide other services or software applications that can include non-virtual and virtual environments. In some embodiments, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, and/or 708 to send access requests for resources in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 710 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the IEEE 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization such as one or more flexible pools of logical storage devices that can be virtualized to maintain virtual storage devices for the server. In various embodiments, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain embodiments. For example, one or more of the data repositories 714, 716 may be used to store information for determining the value of a timeout parameter. The information stored in repositories 714, 716 may, for example, include user attributes and access histories. Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain embodiments, a data repository used by server 712 may be a database, for example, a relational database, such as databases provided by Oracle Corporation® and other vendors. One or more of these databases may be adapted to enable storage, update, and retrieval of data to and from the database in response to SQL or NoSQL-formatted commands.

In certain embodiments, one or more of data repositories 714, 716 may also be used by applications to store application data. The data repositories used by applications may be of different types such as, for example, a key-value store repository, an object store repository, or a general storage repository supported by a file system.

Figure 8:
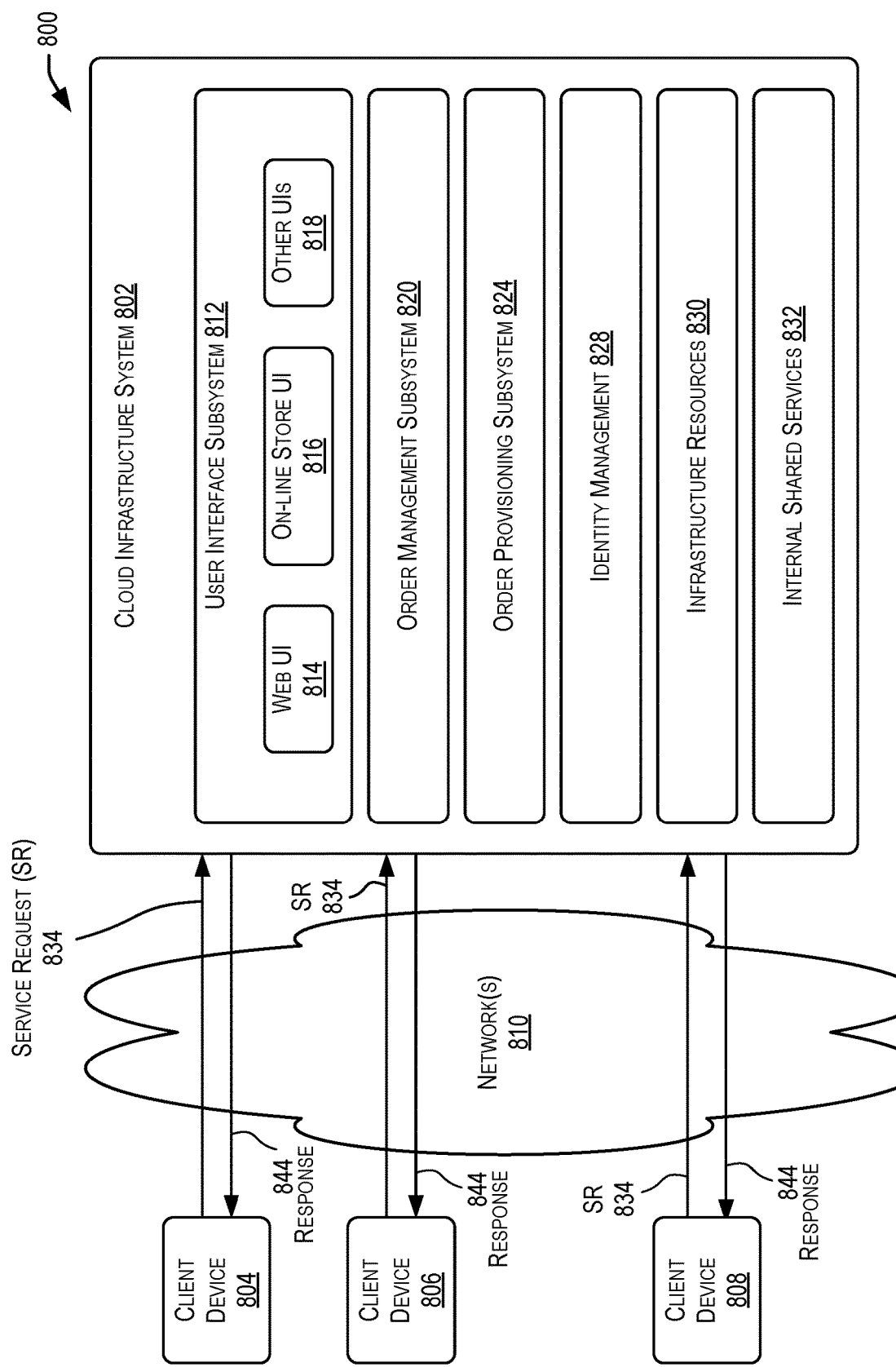
FIG. 8 is a simplified block diagram of a cloud-based system environment, in accordance with certain embodiments.

In certain embodiments, the session timeout-related functionalities described in this disclosure may be offered as services via a cloud environment. FIG. 8 is a simplified block diagram of a cloud-based system environment in which various session timeout-related services may be offered as cloud services, in accordance with certain embodiments. In the embodiment depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other embodiments, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative embodiments.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure. For example, a customer, via a subscription order, may order one or more services provided by cloud infrastructure system 802. Cloud infrastructure system 802 then performs processing to provide the services requested in the customer's subscription order. For example a subscription order may be placed to register a validation client with a validation service. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer can be an individual or an enterprise. In certain other embodiments, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 802 and the services provided may be shared by several organizations in a related community. Various other models such as hybrids of the above mentioned models may also be used.

Client computing devices 804, 806, and 808 may be of different types (such as devices 702, 704, 706, and 708 depicted in FIG. 7) and may be capable of operating one or more client applications. A user may use a client device to interact with cloud infrastructure system 802, such as to request a service provided by cloud infrastructure system 802. For example, a user may use a client device to request a session timeout-related service described in this disclosure.

In some embodiments, the processing performed by cloud infrastructure system 802 for providing session timeout-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 802 to obtain input features, ground truth output features, observations, or other information that can be used to train an ML model to determine a timeout parameter value for a specific user. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain embodiments, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, a service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to. For example, a customer may place a subscription order for a session timeout-related service offered by cloud infrastructure system 802. As part of the order, the customer may provide information identifying a resource for which user-specific timeout parameters are to be generated when a user requests access to that resource.

In certain embodiments, such as the embodiment depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services. In certain embodiments, for a customer requesting the session timeout-related service, the response may include a confirmation that the option to generate user-specific session timeouts has been successfully configured for a particular resource.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain embodiments, cloud infrastructure system 802 comprises an identity management subsystem (IMS) 828 that is configured to manage customers information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
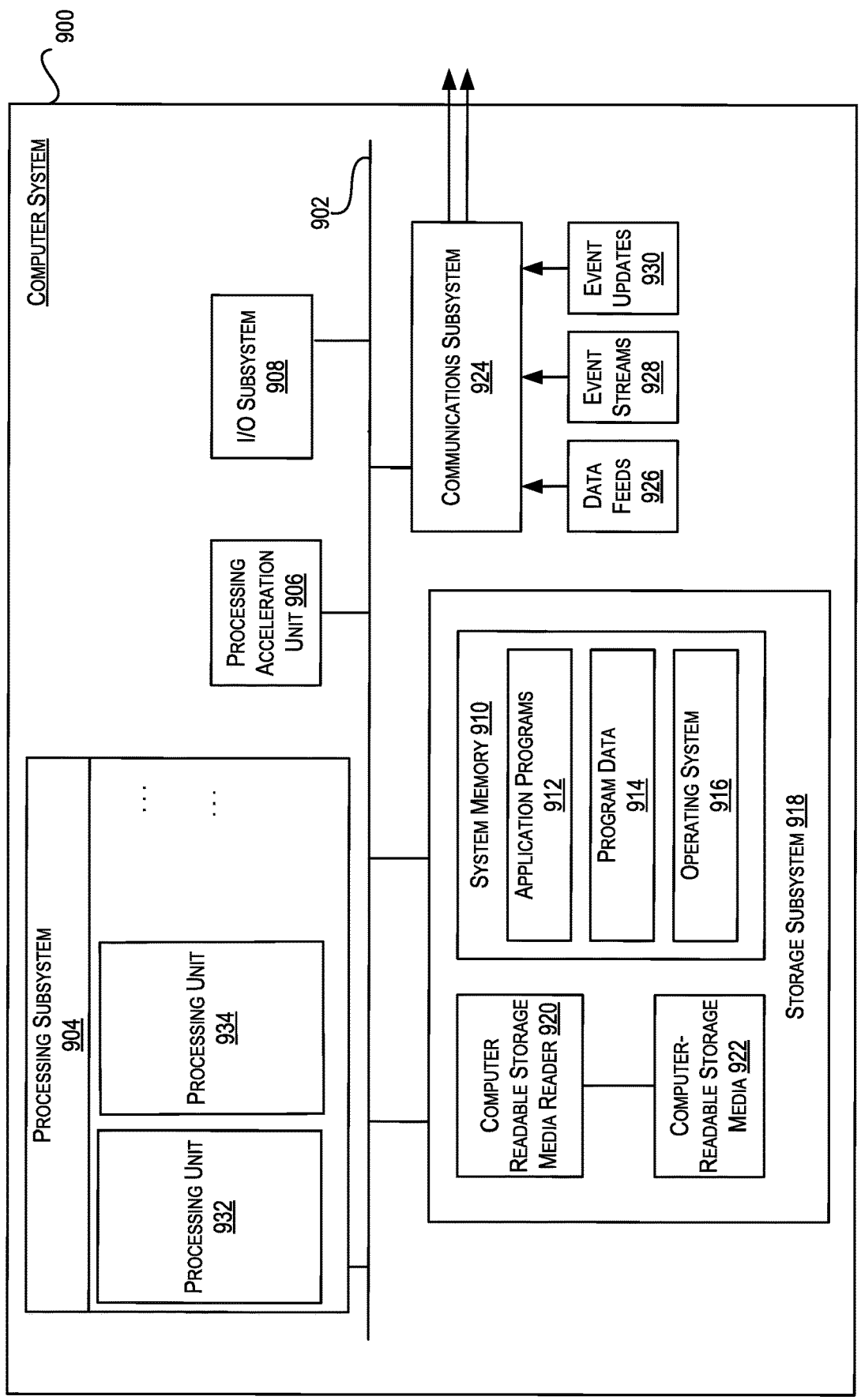
FIG. 9 illustrates an exemplary computer system that may be used to implement certain embodiments.

FIG. 9 illustrates an exemplary computer system 900 that may be used to implement certain embodiments. For example, in some embodiments, computer system 900 may be used to implement any of the access management systems and various servers and computer systems described above. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 6902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain embodiments, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some embodiments. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM may contain data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some embodiments. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 918 may also include a computer-readable storage media reader 920 that can further be connected to computer-readable storage media 922. Reader 920 may receive and be configured to read data from a memory device such as a disk, a flash drive, etc.

In certain embodiments, computer system 900 may support virtualization technologies, including but not limited to virtualization of processing and memory resources. For example, computer system 900 may provide support for executing one or more virtual machines. In certain embodiments, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, the communication subsystem may be used to send communications between a client device and an access management system in connection with user authentication and generation of security tokens.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 924 can provide wired network connectivity (e.g., Ethernet) in addition to or instead of a wireless interface.

Communication subsystem 924 can receive and transmit data in various forms. For example, in some embodiments, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method, comprising:
    receiving, by an access management system, a user credential from a computing device of a first user;
    determining, by the access management system and based on a comparison of the user credential to information stored for the first user, that the user credential is valid; and
    responsive to the determining that the user credential is valid:
        determining, by the access management system, a value for a first timeout parameter, wherein the value depends on information stored for the first user and indicates a time period that, when elapsed, causes the access management system to terminate a session created by the access management system for the first user; and
        sending, by the access management system, the value to the computing device of the first user in at least one of an access token or a session token, the access token being presentable for accessing a protected resource during the session, and the session token being usable by the access management system to track activity of the first user during the session.

2. The method of claim 1, wherein the information stored for the first user comprises a history of one or more previous accesses by the first user to the same protected resource, and wherein the value for the first timeout parameter is determined using a machine learning model that has been trained using the history of one or more previous accesses by the first user.

3. The method of claim 1, wherein the information stored for the first user indicates that the first user is a member of a user group, and wherein the value for the first timeout parameter is determined using a machine learning model that has been trained using a history of one or more previous accesses by other members of the user group to the protected resource.

4. The method of claim 1, wherein the value for the first timeout parameter is determined based on linear regression applied to observations concerning previous accesses by the first user or by multiple users, each previous access being to the same or a different protected resource.

5. The method of claim 1, wherein the first timeout parameter is a session timeout or an idle timeout.

6. The method of claim 1, further comprising:
selecting, by the access management system and based on a first access policy, a first machine learning model for use in determining the value for the first timeout parameter.

7. The method of claim 6, further comprising:
selecting, by the access management system and based on a second access policy, a second machine learning model for use in determining a value for a second timeout parameter; and
determining, by the access management system and using the second machine learning model, the value for the second timeout parameter, wherein the value for the second timeout parameter is sent to the computing device of the first user together with the value for the first timeout parameter.

8. The method of claim 7, wherein the first timeout parameter is a session timeout, and wherein the second timeout parameter is an idle timeout.

9. The method of claim 1, wherein the information stored for the first user comprises information indicating a duration between previous accesses by the first user to the protected resource.

10. The method of claim 1, further comprising:
receiving, by the access management system, a second user credential from a computing device of a second user;
determining, by the access management system and based on a comparison of the second user credential to information stored for the second user, that the second user credential is valid; and
responsive to the determining that the second user credential is valid:
determining, by the access management system, that there is insufficient information stored for the second user;
based on the determining that there is insufficient information stored for the second user, selecting a default value for the first timeout parameter; and
sending, by the access management system, the default value to the computing device of the second user in at least one of a second access token or a second session token.

11. An access management system comprising:
one or more processors; and
a memory coupled to the one or more processors, the memory storing instructions that, when executed by the one or more processors, cause the one or more processors to perform processing comprising:
receiving a user credential from a computing device of a first user;
determining, based on a comparison of the user credential to information stored for the first user, that the user credential is valid; and
responsive to the determining that the user credential is valid:
determining a value for a first timeout parameter, wherein the value depends on information stored for the first user and indicates a time period that, when elapsed, causes the access management system to terminate a session created by the access management system for the first user; and
sending the value to the computing device of the first user in at least one of an access token or a session token, the access token being presentable for accessing a protected resource during the session, and the session token being usable by the access management system to track activity of the first user during the session.

12. The access management system of claim 11, wherein the information stored for the first user comprises a history of one or more previous accesses by the first user to the same protected resource, and wherein the value for the first timeout parameter is determined using a machine learning model that has been trained using the history of one or more previous accesses by the first user.

13. The access management system of claim 11, wherein the information stored for the first user indicates that the first user is a member of a user group, and wherein the value for the first timeout parameter is determined using a machine learning model that has been trained using a history of one or more previous accesses by other members of the user group to the protected resource.

14. The access management system of claim 11, wherein the value for the first timeout parameter is determined based on linear regression applied to observations concerning previous accesses by the first user or by multiple users, each previous access being to the same or a different protected resource.

15. The access management system of claim 11, wherein the first timeout parameter is a session timeout or an idle timeout.

16. The access management system of claim 11, wherein the instructions further cause the one or more processors to perform processing comprising:
selecting, based on a first access policy, a first machine learning model for use in determining the value for the first timeout parameter;
selecting, based on a second access policy, a second machine learning model for use in determining a value for a second timeout parameter; and
determining, using the second machine learning model, the value for the second timeout parameter, wherein the value for the second timeout parameter is sent to the computing device of the first user together with the value for the first timeout parameter.

17. The access management system of claim 16, wherein the first timeout parameter is a session timeout, and wherein the second timeout parameter is an idle timeout.

18. The access management system of claim 11, wherein the information stored for the first user comprises information indicating a duration between previous accesses by the first user to the protected resource.

19. The access management system of claim 11, wherein the instructions further cause the one or more processors to perform processing comprising:
receiving a second user credential from a computing device of a second user;
determining, based on a comparison of the second user credential to information stored for the second user, that the second user credential is valid; and
responsive to the determining that the second user credential is valid:
determining that there is insufficient information stored for the second user;
based on the determining that there is insufficient information stored for the second user, selecting a default value for the first timeout parameter; and
sending the default value to the computing device of the second user in at least one of a second access token or a second session token.

20. A non-transitory computer-readable memory storing instructions that, when executed by one or more processors of an access management system, cause the one or more processors to perform processing comprising:
- receiving a user credential from a computing device of a first user;
- determining, based on a comparison of the user credential to information stored for the first user, that the user credential is valid; and
- responsive to the determining that the user credential is valid:
  - determining a value for a first timeout parameter, wherein the value depends on information stored for the first user and indicates a time period that, when elapsed, causes the access management system to terminate a session created by the access management system for the first user; and
  - sending the value to the computing device of the first user in at least one of an access token or a session token, the access token being presentable for accessing a protected resource during the session, and the session token being usable by the access management system to track activity of the first user during the session.

* * * * *